United States Patent
Dietsch et al.

(10) Patent No.: US 7,681,192 B2
(45) Date of Patent: **\*Mar. 16, 2010**

(54) LOCATION-CENTRIC PROJECT DATA DELIVERY SYSTEM FOR CONSTRUCTION

(75) Inventors: Christopher M. Dietsch, Livermore, CA (US); Mark Edwards Nichols, Christchurch (NZ); Arthur J. Taylor, Boulder, CO (US)

(73) Assignee: Caterpillar Trimble Control Technologies LLC

( * ) Notice: Subject to any disclaimer, the term of this patent is extended or adjusted under 35 U.S.C. 154(b) by 1346 days.

This patent is subject to a terminal disclaimer.

(21) Appl. No.: 11/047,131

(22) Filed: Jan. 31, 2005

(65) Prior Publication Data

US 2006/0174239 A1    Aug. 3, 2006

(51) Int. Cl.
    G06F 9/44 (2006.01)
(52) U.S. Cl. .................................................. 717/172
(58) Field of Classification Search ......... 717/100–103, 717/169–173; 701/50
    See application file for complete search history.

(56) References Cited

U.S. PATENT DOCUMENTS

| | | | |
|---|---|---|---|
| 5,173,710 A | 12/1992 | Kelley et al. | |
| 5,404,661 A | 4/1995 | Sahm et al. | 37/348 |
| 5,438,771 A | 8/1995 | Sahm et al. | |
| 5,510,801 A | 4/1996 | Engelbrecht et al. | |
| 5,519,620 A | 5/1996 | Talbot et al. | |
| 5,614,913 A | 3/1997 | Nichols et al. | |
| 5,699,255 A | 12/1997 | Ellis et al. | |
| 5,760,742 A | 6/1998 | Branch et al. | |
| 5,986,604 A | 11/1999 | Nichols et al. | 342/357.12 |
| 6,038,502 A | 3/2000 | Sudo et al. | |
| 6,047,227 A | 4/2000 | Henderson et al. | 701/50 |
| 6,191,732 B1 | 2/2001 | Carlson et al. | |
| 6,236,924 B1 | 5/2001 | Motz et al. | |
| 6,430,416 B1 | 8/2002 | Loomis | |
| 6,529,828 B1 | 3/2003 | Williams et al. | |
| 6,587,788 B1 | 7/2003 | Green | |
| 6,717,509 B1 | 4/2004 | Murphy | |
| 7,050,893 B2 * | 5/2006 | Watanabe et al. | 701/33 |
| 7,171,295 B2 * | 1/2007 | Furuno et al. | 701/50 |
| 7,245,999 B2 * | 7/2007 | Dietsch et al. | 701/50 |
| 7,295,911 B1 * | 11/2007 | Dietsch et al. | 701/50 |
| 2002/0135518 A1 | 9/2002 | Rabinowitz et al. | |
| 2002/0144294 A1 | 10/2002 | Rabinowitz et al. | |

(Continued)

FOREIGN PATENT DOCUMENTS

| | | |
|---|---|---|
| EP | 0 989 525 A | 3/2000 |
| EP | 1 027 792 A | 8/2000 |
| EP | 1 191 157 A | 3/2002 |
| EP | 1 273 721 A | 1/2003 |
| WO | WO 0188827 | 11/2001 |

(Continued)

OTHER PUBLICATIONS

Baltsavias et al., "Use of DTMs/DSMs and Orthoimages to Support Building Extraction", 1995, CiteSeer, pp. 1-12.*

(Continued)

*Primary Examiner*—Ted T Vo
(74) *Attorney, Agent, or Firm*—Menlo Patent Agency LLC

(57) ABSTRACT

A project data delivery apparatus for automatically delivering project data files to a construction machine based on the geographical location and identification of the construction machine. The apparatus includes a project data distributor for storing, maintaining and transmitting project data files that are associated with project site locations and project plan machine identifications.

32 Claims, 6 Drawing Sheets

U.S. PATENT DOCUMENTS

| | | | |
|---|---|---|---|
| 2002/0145565 A1 | 10/2002 | Rabinowitz et al. | |
| 2002/0165656 A1 | 11/2002 | Adachi et al. | 701/50 |
| 2002/0199196 A1 | 12/2002 | Rabinowitz et al. | |
| 2004/0024510 A1 | 2/2004 | Finley et al. | |
| 2004/0122570 A1 | 6/2004 | Sonoyama et al. | |
| 2004/0148083 A1* | 7/2004 | Arakawa et al. | 701/50 |
| 2004/0210371 A1 | 10/2004 | Adachi et al. | 701/50 |
| 2005/0004749 A1 | 1/2005 | Park | 701/200 |
| 2006/0044146 A1 | 3/2006 | Ferguson et al. | 340/679 |

FOREIGN PATENT DOCUMENTS

| | | |
|---|---|---|
| WO | WO 02/063405 A | 8/2002 |
| WO | WO 2006/083459 | 8/2006 |
| WO | WO 2006/083460 | 8/2006 |

OTHER PUBLICATIONS

Pfeffer, "A Mobile Sensor Platform for Construction Metrology and Automation: Design and Initial Results", Aug. 1999, Field and Service Robotics International Conference FSR' 99, Proceedings, pp. 310-315.*

METSmanager User Guide, Version 2.2, Revision A, Nov. 2002, Trimble Navigation Limited Engineering and Construction Division, Dayton, Ohio, pp. 1-100.

Patent Cooperation Treaty, Written Opinion of the International Searching Authority, patent application PCT/US2005/047547, 6 pages, Apr. 26, 2006.

Patent Cooperation Treaty, International Preliminary Report on Patentability, patent application PCT/US2005/047547,11 pages, Mar. 22, 2007.

Patent Cooperation Treaty, Written Opinion of the International Searching Authority, patent application PCT/US2005/047548, 5 pages, May 23, 2006.

Patent Cooperation Treaty, International Preliminary Report on Patentability, patent application PCT/US2005/047548, 14 pages, May 21, 2007.

PRC Patent Office, First Office Action for PCT National Phase Application 200580047306.1; 3 pages cover, 5 pages English, 14 pages Chinese, Dec. 19, 2008.

* cited by examiner

| PROJECTS | PROJECT SITE LOCATION | PROJECT PLAN MACHINE IDENTIFICATION | | COMM SYSTEM | WORK-ORDER | PROJECT DATA FILES | | | | |
|---|---|---|---|---|---|---|---|---|---|---|
| | | | | | | APP PROGRAM | GEOGRAPHIC CALIBRATION | DESIGN CONTROL | | |
| | | | | | | | | DESIGN | CURRENT | BACKGROUND |
| PROJECT 1 | LOCATION 1 PAGE 1 | A | GRADER | COMM 11A | TASK 11A | APPLET 11A | GEO CAL 11 | DESIGN DTM 11 | CURRENT DTM 11 | BACKGROUND FILES 11 |
| | | B | BULLDOZER | COMM 11B | TASK 11B | APPLET 11B | | | | |
| | | C | SUPERVISOR | COMM 11C | TASK 11C | APPLET 11C | | | | |
| | | D | SURVEYOR | COMM 11D | TASK 11D | APPLET 11D | | | | |
| | | E | HOLE DIGGER | COMM 11E | TASK 11E | APPLET 11E | | | | |
| | LOCATION 1 PAGE 2 | F | GRADER | COMM 12F | TASK 12F | APPLET 12F | GEO CAL 12 | DESIGN DTM 12 | CURRENT DTM 12 | BACKGROUND FILES 12 |
| | | G | BULLDOZER | COMM 12G | TASK 12G | APPLET 12G | | | | |
| | | H | SUPERVISOR | COMM 12H | TASK 12H | APPLET 12H | | | | |
| | | I | SURVEYOR | COMM 12I | TASK 12I | APPLET 12I | | | | |
| | | J | HOLE DIGGER | COMM 11J | TASK 11J | APPLET 11J | | | | |
| | LOCATION 1 PAGE n | K | GRADER | COMM 1nK | TASK 1nK | APPLET 1nK | GEO CAL 1n | DESIGN DTM 1n | CURRENT DTM 1n | BACKGROUND FILES 1n |
| | | L | BULLDOZER | COMM 1nL | TASK 1nL | APPLET 1nL | | | | |
| | | M | SUPERVISOR | COMM 1nM | TASK 1nM | APPLET 1nM | | | | |
| | | N | SURVEYOR | COMM 1nN | TASK 1nN | APPLET 1nN | | | | |
| | | O | HOLE DIGGER | COMM 1nO | TASK 1nO | APPLET 1nO | | | | |
| PROJECT 2 | LOCATION 2 PAGE 1 | P | GRADER | COMM 21P | TASK 21P | APPLET 21P | GEO CAL 21 | DESIGN DTM 21 | CURRENT DTM 21 | BACKGROUND FILES 21 |
| | | Q | BULLDOZER | COMM 21Q | TASK 21Q | APPLET 21Q | | | | |
| | | R | SUPERVISOR | COMM 21R | TASK 21R | APPLET 21R | | | | |
| | | S | SURVEYOR | COMM 21S | TASK 21S | APPLET 21S | | | | |
| | | T | HOLE DIGGER | COMM 21T | TASK 21T | APPLET 21T | | | | |
| PROJECT n | LOCATION n PAGE 1 | U | GRADER | COMM n1U | TASK n1U | APPLET n1U | GEO CAL n1 | DESIGN DTM n1 | CURRENT DTM n1 | BACKGROUND FILES n1 |
| | | V | BULLDOZER | COMM n1V | TASK n1V | APPLET n1V | | | | |
| | | W | SUPERVISOR | COMM n1W | TASK n1W | APPLET n1W | | | | |
| | | X | SURVEYOR | COMM n1X | TASK n1X | APPLET n1X | | | | |
| | | Y | HOLE DIGGER | COMM n1Y | TASK n1Y | APPLET n1Y | | | | |

FIG. 3

| PROJECTS | PROJECT SITE LOCATION | PROJECT PLAN MACHINE IDENTIFICATION | | PROJECT DATA FILES | | | |
|---|---|---|---|---|---|---|---|
| | | | | WORK-ORDER | DESIGN CONTROL | | |
| PROJECT 1 | LOCATION 1 PAGE 1 | B BULLDOZER | ELEVATION e1 | TASK 11B-e1 | DESIGN DTM 11-e1 | CURRENT DTM 11-e1 | BACKGROUND FILES 11-e1 |
| | | | ELEVATION e2 | TASK 11B-e2 | DESIGN DTM 11-e2 | CURRENT DTM 11-e2 | BACKGROUND FILES 11-e2 |
| | | | ELEVATION e3 | TASK 11B-e3 | DESIGN DTM 11-e3 | CURRENT DTM 11-e3 | BACKGROUND FILES 11-e3 |
| | | | ELEVATION e4 | TASK 11B-e4 | DESIGN DTM 11-e4 | CURRENT DTM 11-e4 | BACKGROUND FILES 11-e4 |

FIG. 4

| PROJECTS | PROJECT SITE LOCATION | PROJECT PLAN MACHINE IDENTIFICATION | | PROJECT DATA FILES | | | |
|---|---|---|---|---|---|---|---|
| | | | | WORK-ORDER | DESIGN CONTROL | | |
| PROJECT 1 | LOCATION 1 PAGE 1 | B BULLDOZER | TIME t1 | TASK 11B-t1 | DESIGN DTM 11-t1 | CURRENT DTM 11-t1 | BACKGROUND FILES 11-t1 |
| | | | TIME t2 | TASK 11B-t2 | DESIGN DTM 11-t2 | CURRENT DTM 11-t2 | BACKGROUND FILES 11-t2 |
| | | | TIME t3 | TASK 11B-t3 | DESIGN DTM 11-t3 | CURRENT DTM 11-t3 | BACKGROUND FILES 11-t3 |
| | | | TIME t4 | TASK 11B-t4 | DESIGN DTM 11-t4 | CURRENT DTM 11-t4 | BACKGROUND FILES 11-t4 |

FIG. 5

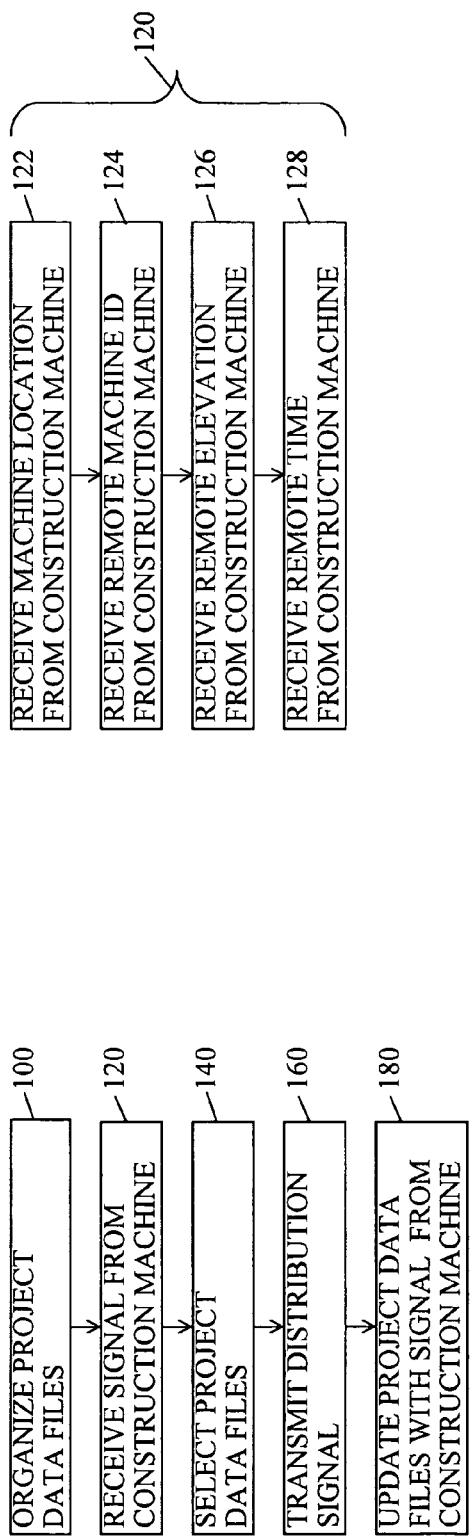
FIG. 6
FIG. 7A
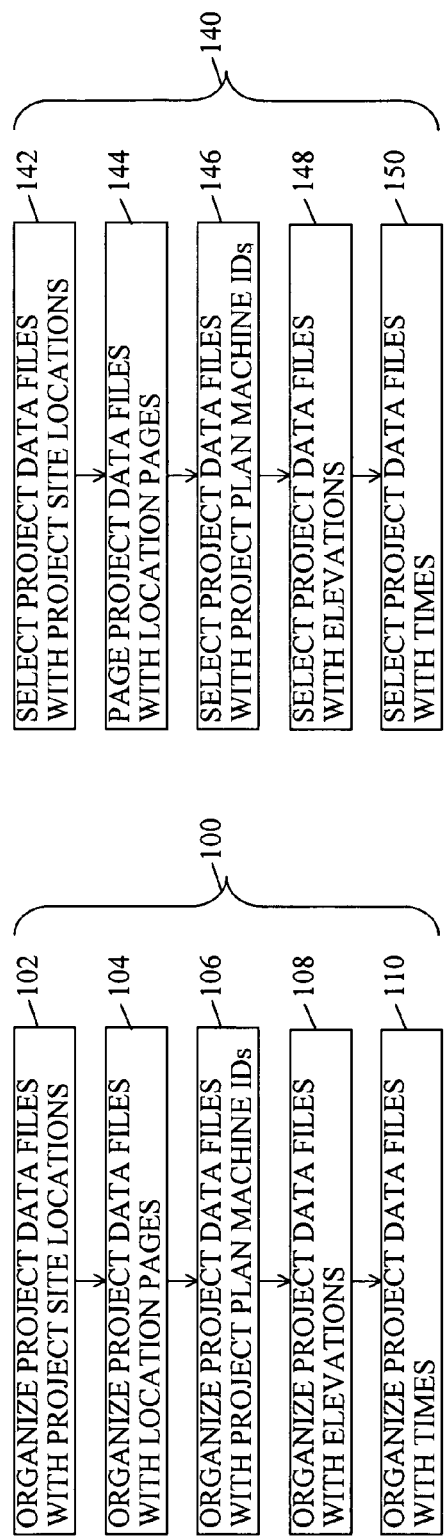
FIG. 7B
FIG. 7C

US 7,681,192 B2

LOCATION-CENTRIC PROJECT DATA DELIVERY SYSTEM FOR CONSTRUCTION

BACKGROUND OF THE INVENTION

1. Field of the Invention

The invention relates generally to data file delivery systems for construction projects and more particularly to a system for automatically delivering project data files to a construction machine based on the geographical location and identification of the construction machine.

2. Description of the Background Art

The use of digital project data files and precise machine positioning is becoming more common for construction project applications such as mining, roads, land fill, site preparation and building. The project data files generally include digital terrain models. The digital terrain models have geographical and elevation coordinates for current and planned design surfaces. The workers at project sites use the terrain models with precise local positions for operating construction machines such as excavators, stakers, bulldozers, post hole diggers, and the like. The worker arrives at the site, unloads the machine and begins determining positions. However, before he can begin work he needs to be given the project data files that are pertinent for his project and machine.

The project data files are generally stored and maintained in a project database somewhere other than the project site. There may be project data files for tens of different projects and hundreds of machines in a central database at a headquarters office. These files may be carried to the site in a hardware form such as a compact disc or downloaded using a radio system or telephone connection from the database to each machine. However, there is the non-trivial task of sorting out the digital terrain models that are pertinent to a particular project for a particular machine from the hundreds of others. The task is made more difficult for projects covering a large area because the size of the data files becomes unwieldy and geographical calibrations may be different for different locations within the project. Existing systems accomplish the selection task with the use of project and work order numbers. Unfortunately, the use of project and workorders numbers can be subject to daily human error and, in any case, become difficult to implement when the machines move their location across geographical boundary lines within the project site that may not be visible to the operator.

There is a need for a construction project data delivery apparatus that automatically selects and delivers the project data files that are pertinent for a construction machine at a project site. There is a further need for a construction project data delivery apparatus that automatically delivers new project data as the machine moves within the site.

SUMMARY OF THE INVENTION

The present invention is a project data delivery apparatus for selecting and delivering project data files for a construction project. The project data delivery apparatus includes a project data distributor that transmits the project data files that are associated with the geographical location and identification of a remote construction machine. The project data files may include geographical coordinate calibrations, communication system directions, work orders, design and current digital terrain models, background files, and application programs.

The project data distributor stores and maintains the project data files in association with project site locations and project plan machine identifications. In some cases the project site locations are segmented into location pages. The remote construction machine transmits a geographical location and identification to the project data distributor. The project data distributor uses the location and identification from the machine for searching a project database of project data files and selects only those project data files for the project site location and project plan machine identification matching the location and the identification from the machine. The selected project data files are then transmitted to the machine. When the machine moves within the project site, it continues to transmit its remote location. When the remote location moves to a new location page in the database, the project data distributor automatically selects and transmits the project data files for the new location page to the machine.

In one embodiment, the present invention is a location-centric construction project data delivery apparatus having a database including construction project data files organized in association with project site locations; a receiver for receiving a machine signal having information for a location from a remote construction machine; a search program for selecting the project data files where the site location encompasses the machine location; and a data distribution transmitter for transmitting a distribution signal having the location-selected project data files to the construction machine. In a variation or an extension of this embodiment, the project data files are organized in association with project plan machine identifications; the machine signal includes information for a remote identification of the machine; and the search program searches the database for selecting the project data files where the project plan machine identification matches the remote machine identification.

In another embodiment, the present invention is a location-centric method for distributing project data files for construction having steps of organizing construction project data files in association with project site locations in a database; receiving a machine signal having information for a location from a remote construction machine; selecting the project data files where the project site location encompasses the machine location; and transmitting a distribution signal having the location-selected project data files to the construction machine. In a variation or an extension of this embodiment, a method has steps of organizing the project data files in association with project plan machine identifications, the machine signal having information for a remote identification of the machine; and selecting the project data files where the project plan machine identification matches the remote machine identification.

In another embodiment, the present invention is a tangible medium having a database in a form that may be read by a search program, comprising: project site locations, project plan machine identifications for construction machines, and construction project data files organized in association with the project site locations and/or the project plan machine identifications.

An advantage of the construction apparatus of the present invention is that the project date files that are pertinent for a particular construction machine are automatically selected before being delivered to the machine so that the machine or machine operator does not need to sort through unneeded files. Another advantage is that the selected project data files are automatically selected according to the location and identification of the machine so that work and project numbers do not need to be used in order to deliver the pertinent project data files. Another advantage is that updated project data files may be delivered automatically as the machine moves location within a project site.

These and other embodiments and advantages of the present invention will no doubt become obvious to those of ordinary skill in the art after having read the following detailed description of the best mode for carrying out the invention and viewing the various drawings.

BRIEF DESCRIPTION OF THE DRAWINGS

FIG. 3 is a chart for the project data files of FIG. 2;

FIG. 4 is a chart showing elevation ranges for the project data files of FIGS. 2 and 3;

FIG. 5 is a chart showing time ranges for the project data files of FIGS. 2 and 3;

FIG. 6 is a flow chart for a method of the present invention for distributing project data files;

FIGS. 7A, 7B and 7C are flow charts for organizing project data files, receiving a machine signal and selecting project data files for the method of FIG. 6.

BEST MODE FOR CARRYING OUT THE INVENTION

The details of the preferred embodiments for carrying out the idea of the invention will now be described. It should be understood that the description of these details is not intended to limit the invention to these details. On the contrary these details are merely intended to describe the best mode known to the inventors for carrying out the idea of the invention. Numerous alternatives, modifications and equivalents of the embodiments described herein will be apparent to someone skilled in the art as within the scope of the idea of this invention.

Figure 1:
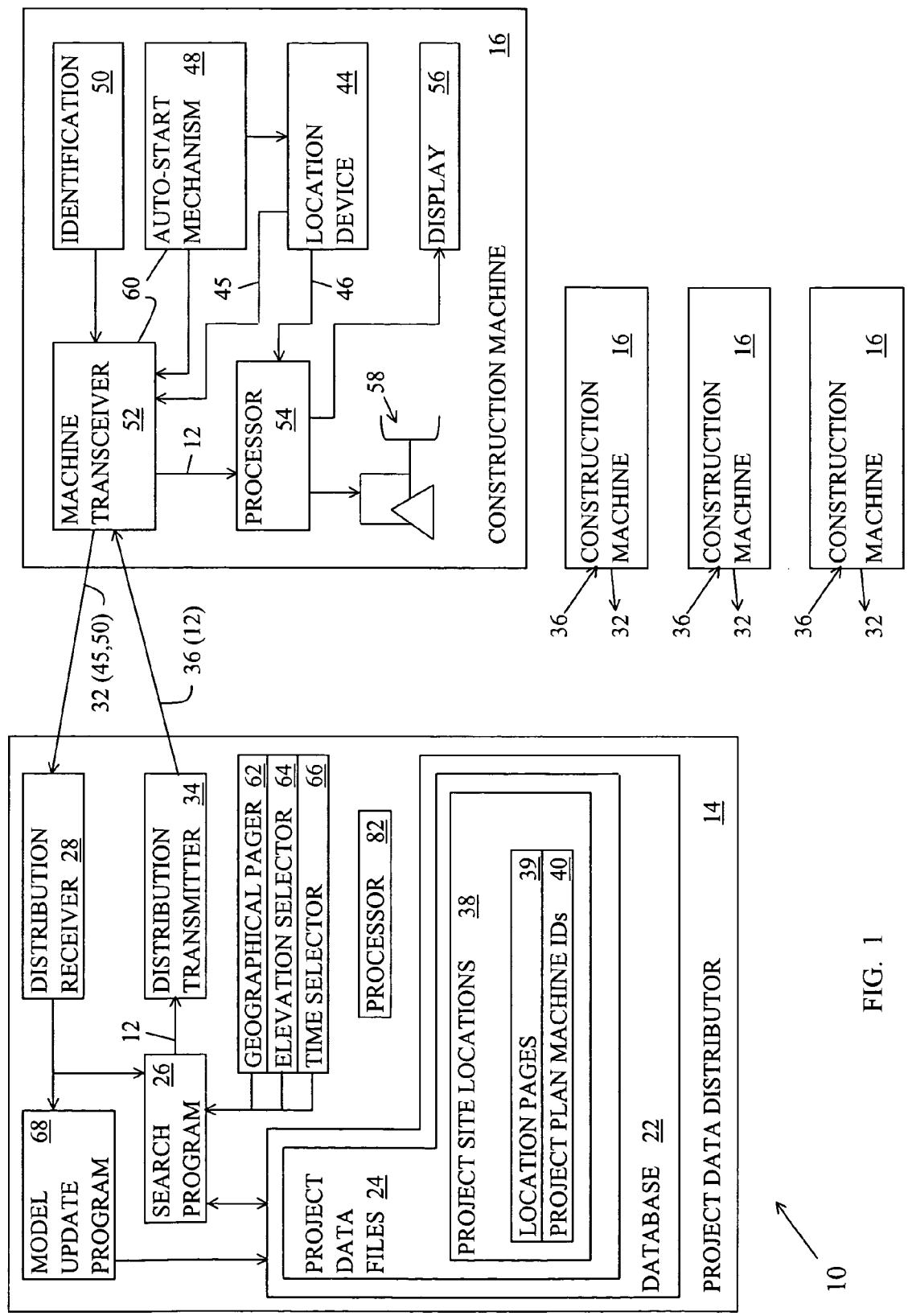
FIG. 1 is a block diagram of a construction project data delivery apparatus of the present invention.

FIG. 1 illustrates a construction project data delivery apparatus of the present invention referred to with a reference number 10 for distributing location-selected project data files 12. The apparatus 10 includes a project data distributor 14 and at least one construction machine 16. The project data distributor 14 may be considered a specialized server for construction projects. Tens or hundreds of construction machines 16 may be used with the apparatus 10. The project data distributor 14 may reside at a single base station location or may have component parts in several different geographical locations that are in communication with each other.

Whether the data distributor 14 is located at a single location or separated into component parts in widely scattered locations, it effectively includes a project control database 22 of project data files 24 for construction projects, a search program 26 for finding the selected project data files 12, a distribution receiver 28 for receiving signals 32 from the construction machines 16, and a distribution transmitter 34 for transmitting distribution signals 36 having the selected data project files 12 to the construction machines 16. The project data files 24 are stored and maintained in the database 22 in association with project site locations 38 for the geographical area of the construction project, location pages 39 for smaller geographical areas within the area the project site location 38, and construction project plan machine identifications 40.

The term "construction" is defined to include construction for buildings and pipelines, stakeout, grading, land fill, mining, road building, trenching, excavating, and the like where real property is being transformed by machinery. The construction machine 16 is defined as a machine used for construction. Examples of construction machines 16 are graders, bulldozers, surveyors, excavators, post hole diggers, cranes, trenchers, stakers, and the like. The construction machine 16 can also be a supervisor's management tool insofar as it is used for the construction project at the project site. For example the tool can be a computing device such as a laptop, personal digital assistant (PDA), cellphone with PDA capability, or the like.

The construction machine 16 includes a location device 44 for providing a remote machine location 45 for start up and a precise position 46 for operation, an auto-start mechanism 48, an identification 50, a transceiver 52, a processor 54, a display 56, and may include a construction implement 58. The identification 50 is stored in a way to be readable by the auto-start mechanism 48. The auto-start mechanism 48 and transceiver 52 may be considered as an auto-start transceiver 60. At power turn-on or return from a standby mode or with a key stroke, the auto-start mechanism 48 performs an auto-start to instruct the location device 44 to compute the location 45 and instruct the transceiver 52 to transmit the location 45 and the identification 50 in the signal 32. The search program 26 uses the location 45 and identification 50 for searching the project data files 24 in the database 22 for finding the particular set of selected project data files 12 where the project site location 38 encompasses the remote machine location 45 and the project plan machine identification 40 matches the remote machine identification 50.

The distribution transmitter 34 transmits the location-selected project data files 12 in the distribution signal 36 to the machine transceiver 52. The auto-start mechanism 48 instructs the transceiver 52 to receive the selected project data files 12 in the distribution signal 36 and pass the data to the processor 54. The processor 54 processes the selected project data files 12 into a form where they can be used directly by the construction implement 58 for operation or used by being displayed on the display 56 in a manner so that a human worker can operate the construction machine 16.

The invention is not dependent on the method by which the signals 32 and 36 are communicated. The signals 32 and 36 are preferably wireless signals, such as radio, cellular telephone, satellite, optical and the like, when they are transmitted and received by the machine transceiver 52. However, the signals 32 or 36 may be transmitted and received by the machine 16 using landline telephones. The signals 32 and 36 may be converted between landline and wireless signals using either fulltime lines or packets any number of times between the distribution receiver and transmitter 28 and 34 and the transceiver 52.

The location device 44 may use two different instruments and/or use two different methods for first quickly determining the location 45 for automatic project data delivery, and then precisely determining the location or position 46 for operation of the machine 16 according to the project data. The location 45 is used for automatically selecting which of the many sets of project data files 24 that are stored in the database 22 are selected and delivered to the construction machine 16. With the use of this location 45, the operator of the construction machine 16 automatically and seamlessly receives only the information that he needs for his work without having to sort through unneeded files.

The location 46 is used with the selected project data files 12 for directing or informing the operator of the machine 16 or for operating the machine 16 directly. For example, the selected project data files 12 may guide the operator to raise or lower the level of the blade or shovel of the implement 58 to the design surface carried in a digital terrain model in the selected project data files 12. It should be noted that the position accuracy of the location 45 for finding the selected project data files 12 may be several meters or even tens of meters whereas the location 46 may require centimeter accuracy for directing the implement 58. Typically, the precise location 46 is determined with the aid of reference location information obtained by receiving a radio signal for calibrating the raw location information measured at the machine 16.

A GPS receiver may be used for the location device 44 for providing the location 45 and a real time kinematic (RTK) GPS receiver may be used for providing the location 46. An exemplary RTK GPS system is described by in U.S. Pat. No. 5,519,620, incorporated herein by reference, entitled "centimeter accurate global positioning system receiver for on-the-fly real-time-kinematic measurement and control" by Nicholas C. Talbot et al. However, the apparatus 10 is not dependent on the device or manner in which the information for the locations 45 and 46 are determined. A user may enter a location that is different than the actual location of the machine 16 and the entered location may be used as the location 45.

Several examples of systems for determining location will now be referenced. Location may be determined by ranging or timing with global navigation satellite system (GNSS) signals such as GPS signals, global orbiting navigational satellite system (GLONASS) signals, Galileo signals and the like. The GNSS signals are normally broadcast by satellites but may be broadcast by pseudolites. Location is preferably in the form of geographical coordinates such as latitude, longitude and altitude along with time. However, location may also be in the form of pseudoranges that are processed in the project data distributor 14 in order to provide the geographical coordinates for the location.

Location can also be determined with terrestrial positioning systems. One example of such terrestrial positioning system is the system proposed by Kelley et al. in U.S. Pat. No. 5,173,710 entitled "navigation and positioning system and method using uncoordinated beacon signals" incorporated herein by reference. Another example is the hybrid radio location system using both radio and GPS pseudoranges that is described by Loomis in U.S. Pat. No. 6,430,416 incorporated herein by reference.

Another example is the system described by Matthew Rabinowitz and James Spilker in U.S. application Ser. No. 10/159,478 filed May 31, 2002 and assigned to Rosum Corporation of Redwood City, Calif., entitled "position location using global positioning system signals augmented by broadcast television signals" which is incorporated herein by reference. This applications shows methods and apparatus' using broadcast television signals in conjunction with GPS signals to determine the position of a user.

Another example is the system described by Matthew Rabinowitz and James Spilker in U.S. application Ser. No. 10/054,302 filed Jan. 22, 2002 and assigned to Rosum Corporation of Redwood City, Calif., entitled "position location using broadcast analog television signals" which is incorporated herein by reference. This applications shows methods and apparatus' using a plurality of analog television transmitters at known reference points to determine the position of a user.

Another example is the system described by Matthew Rabinowitz and James Spilker in U.S. application Ser. No. 09/932,010 filed Aug. 17, 2001 and assigned to Rosum Corporation of Redwood City, Calif., entitled "position location using terrestrial digital video broadcast television signals" which is incorporated herein by reference. Another example is the system described by Matthew Rabinowitz and James Spilker in U.S. application Ser. No. 10/054,262 filed Jan. 22, 2002 and assigned to Rosum Corporation of Redwood City, Calif., entitled "time-gated delay lock loop tracking of digital television signals" which is incorporated herein by reference. These two applications show methods and apparatus' using a plurality of digital television transmitters at known reference points to determine the location of a user.

Other examples location determination systems that may be used for determining location are radio navigation systems (RNS) using either triangulation or timing, position augmentation services (PAS) using local location signals transmitted from local reference points to augment RNS and/or GNSS signals, and the like. One such system known commercially as a Terralite™ XPS system made by Novariant, Inc. of Menlo Park, Calif., uses self-surveying XPS stations for augmenting the GPS system.

The project data distributor 14 also includes a geographical pager 62, an elevation selector 64, a time selector 66 and a model update program 68. The geographical pager 62, the elevation selector 64 and the time selector 66 operate with the search program 26 for further selecting the selected project data files 12 for the location page 39, elevation and time, respectively, that are designated by the remote location 45. It should be understood that time can be included with the location 45.

After auto-start, under control of the operator of the machine 16 or automatically when the location 45 changes or with some other automatic basis, the construction machine 16 continues to transmit new positions for its remote location 45 and identification 50 in the signal 32 to the project data distributor 14. As the machine 16 moves across boundaries at the construction site that may be invisible, the geographical pager 62 operates with the search program 26 for paging through the selected project data files 12 for selecting the files 12 that are associated with the location page 39 that encompasses the new positions of the remote location 45. Similarly, the elevation selector 64 operates with the search program 26 for selecting the location-selected project data files 12 that are associated with elevation ranges that encompasses the new position of the remote location 45. The time selector 66 operates with the search program 26 for selecting the location-selected project data files 12 that are associated with time ranges that encompasses the time of the remote location 45. The model update program 68 uses the remote location 45 and identification 50 for updating the selected project data files 12 for current information, such as a current surface, at the construction site.

Figure 2:
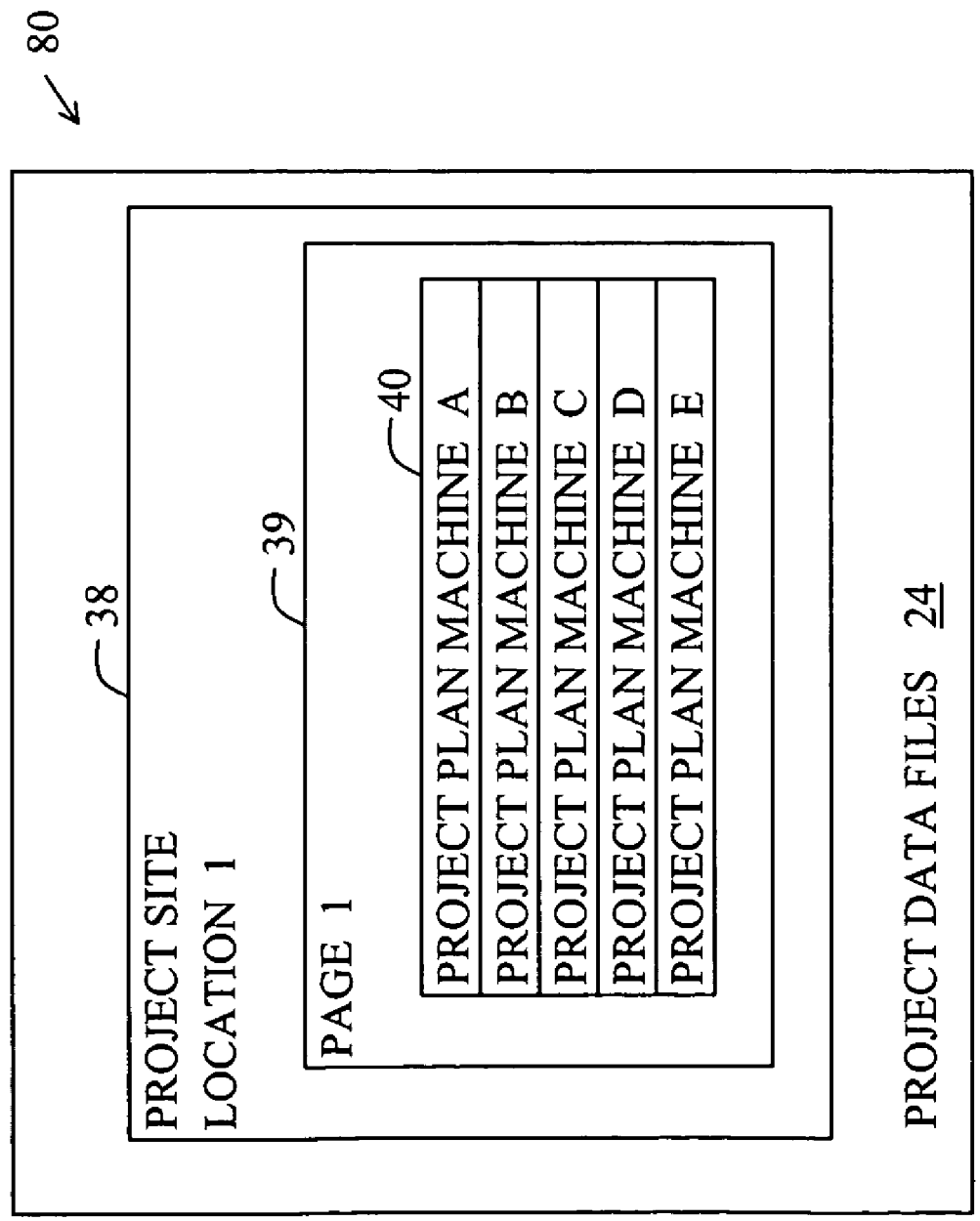
FIG. 2 is a block diagram of project data files for the project data delivery apparatus of FIG. 1.

FIG. 2 represents the way in which the project data files 24 are organized. The project data files 24 are stored in association with project site locations 38. A first of the project site locations 38 is shown as project site location 1. The project data files 24 may be further associated with location pages 39 having areas within the project site locations 38. A first of the location pages 39 within the project site location 1 is shown as page 1. The project data files 24 are further associated with project plan machine identifications 40. The project plan machine identifications 40 are shown as A, B, C, D and E. The search program 26 searches the project data files 24 according to the remote location 45 for the project site location 38 and page 39, and according to the remote machine identification 50 for the project plan machine identification 40 into order to select the selected project data files 12 that are transmitted to the remote machine 16.

The project data files 24 on the database 22, organized as described herein, may be contained on a tangible medium 80 in a form that may be read by the search program 26 and written to by the model update program 68. The medium may be a digital memory device such as a digital video device (DVD), compact disk (CD), electronic memory chips, a hard disk, or the like. The search program 26 and the other elements of the project data distributor 14 are controlled by one or more digital processors 82 (FIG. 1).

FIG. 3 represents the database 22 of the present invention. The database 22 comprises data for individual projects shown as projects 1, 2 through n. The project data files 24 for the projects 1, 2 through n have the associated project site locations 38. The project site locations 38 are illustrated with numbers 1, 2 through n corresponding respectively to the projects. The data in the project site locations 1, 2 through n define the geographical boundaries enclosing the area of the site. Each of the project site locations 1, 2 through n may be subdivided into, possibly overlapping, pages 39 illustrated as pages 1, 2 through n where the location page 39 has a geographical area within the area of the project site location 38.

The project site locations 1, 2 through n and the location pages 1, 2 through n have one or more project plan machine identifications 40, designated A through Y, for the construction machines 16 that are scheduled for the projects. For the page 1 of the project site location 1, the project plan machine identifications 40 are designated A (grader), B (bulldozer), C (supervisor laptop), D (surveyor) through E (post hole digger). The identifications A through Y represent exemplary project plan machine identifications 40 for page 1 of the project site location 1 through to page n of the project site location n. It should be noted that the database 22 is not limited to A through Y identifications but can be a much larger number if desired.

Moreover, each of the project plan machine identifications A through Y may be repeated and associated in the database 22 with the project data files 12 for several different project site locations 1, 2 through n. For example, the project plan identification designated as A (grader) may have project data files 12 associated with any or all of the project site locations 1, 2 through n. For this example, when the grader A is located at a project site location 2, page 1, it would receive the selected project data files 12 for the identification A (grader) and location 2, page 1. Using the nomenclature of the figure, the selected project data files 12 would have comm 21A, task 21A, applet 21A, geo cal 21, design DTM 21, current DTM 21 and background files 21.

The project data files 24 include files for communication system (comm system), work order, application program (app program), geographic calibration and design control. The design control files include a design surface digital terrain model (DTM), a current surface digital terrain model (DTM), and background files having general information. The design and current DTMs have precise geographical coordinates.

The design DTM represents the surface that is required according to the construction plan. The current DTM represents a surface as it exists or existed that may be updated from the construction machine 16 to the database 22. For example, a grader may have graded an area at the project site to a level that is part way between an original current surface and the required design surface. When the machine 16 arrives on site it typically needs both the design and current DTMs.

Digital terrain models have the essential data for defining a surface in three dimensions. There are several digital terrain model formats such as a grid model, an irregular triangular network model, and an element based model. A grid model has equally spaced horizontal points showing elevations. For example, the model may contain the elevations for a one meter by one meter grid. An irregular triangular network has a sparse grid of horizontal points with elevations and irregular triangles for defining the surfaces between the points. The irregular triangular network model is commonly used by surveyors. An element based system has connected horizontal straights and curved elements with vertical elements and vertical cross-sections. The element based model may be most efficient for road building.

The project data files 24 for the communication system, work order and application program are represented as being individual files for respective project plan machine identifications A through Y for respective project site locations 1 through n and respective location pages 1 through n. The project data files 24 for geographical calibration and design control are represented as common master files for the project plan machine identifications A through Y for respective locations 1 through n and respective pages 1 through n. However, any of the files may be stored individually or as master files for each of the identifications A through Y or each type of machine (grader, bulldozer, supervisor laptop, surveyor, and the like) for the identifications A through Y or the location pages 1 through n within a particular project site 1 through n.

At auto-start, the machine 16 needs to be able to transmit the machine signals 32 having the location 45 and identification 50 and the project data distributor 14 needs to be able to receive the signals 32 in order to search the database 22 for selecting the project data files 12. This or further communication with the signals 32 and 36 and the machine 16 may be specified by the communication system information in the selected files 12.

The communication system specifies the equipment, channels, coding, routing and the like for the machine signals 32 and the distribution signals 36 for communication between the project data distributor 14 and the individual construction machines 16. For example, the comm 11A specifies the communication system for the project plan machine identification A (grader) when the machine corresponding to A (grader) is at location 1, page 1. The comm 12F specifies the communication system for the project plan machine identification F (grader) when the machine corresponding to F (grader) is at location 1, page 2. The comm 1nK specifies the communication system for the project plan machine identification K (grader) when the machine corresponding to K (grader) is at location 1, page n. The comm 21P specifies the communication system for the project plan machine identification P (grader) when the machine corresponding to P (grader) is at location 2, page 1. The comm n1U specifies the communication system for the project plan machine identification U (grader) when the machine corresponding to U (grader) is at location n, page 1. The communication systems are similarly specified for the project plan machine identifications A-Y when the corresponding machines 16 are at their respective locations 1 through n and location pages 1 through n.

The work order specifies the tasks that are to be performed by the individual remote machines A through Y. For example, the task 11A specifies the task that is to be performed by the machine 16 corresponding to the project plan machine identification A (grader) when the machine 16 is at location 1, page 1. The task 12F specifies the task that is to be performed by the machine 16 corresponding to the project plan machine identification F (grader) when the machine 16 is at location 1, page 2. The task 1nK specifies the task that is to be performed by the machine 16 corresponding to the project plan machine identification K (grader) when the machine 16 is at location 1, page n. The task 21P specifies the task that is to be performed by the machine 16 corresponding to the project plan machine identification P (grader) when the machine 16 is at location 2, page 1. The task n1U specifies the task that is to be performed by the machine 16 corresponding to the project plan machine identification U (grader) when the machine 16 is at location n, page 1. The tasks are similarly specified for the project plan machine identifications A-Y when the corresponding machines 16 are at their respective locations 1 through n and location pages 1 through n.

The geographic calibrations calibrate the coordinates of the precise location 46 determined by the location device 44 to a local coordinate system used for the project. For example, the location device 44 may include a precise positioning global positioning system (GPS) receiver for determining the location 46 in terms of real time kinematic (RTK) coordinates with respect to an RTK reference and a WGS84 datum model. The local position coordinates for the project will in general be referenced to some other mark. The geographical calibration calibrates the precise location 46 to the local coordinates in order to use the digital terrain models for its work. The geographic calibration 11 calibrates the machines 16 corresponding to the project plan machine identifications A-E for the page 1 of the location 1. The geographic calibration 12 calibrates the machines 16 corresponding to the project plan machine identifications F-J for the page 2 of the location 1. The geographic calibration 1n calibrates the machines 16 corresponding to the project plan machine identifications K-O for the page n of the location 1. The geographic calibration 21 calibrates the machines 16 corresponding to the project plan machine identification P-T for the page 1 of the location 2. The geographic calibration n1 calibrates the machines 16 corresponding to the project plan machine identification U-Y for the page 1 of the location n.

The design control files are categorized as design digital terrain models (DTM)s, current digital terrain models (DTM)s, and background files. The design control files are stored in association with the pages 1 through n of the project site location 1 through n. For example, the design DTM 11, current DTM 11 and background files 11 represent design control files 11 associated with project plan machine identifications A-E at location 1, page 1. The design DTM 12, current DTM 12 and background files 12 represent design control files 12 associated with project plan machine identifications F-J at location 1, page 2. The design DTM 1n, current DTM 1n and background files 1n represent the design control files 1n associated with project plan machine identifications K-O at location 1, page n. The design DTM 21, current DTM 21 and background files 21 represent design control files 21 associated with project plan machine identifications P-T at location 2, page 1. The design DTM 1n, current DTM 1n and background files 1n represent design control files n1 associated with project plan machine identifications U-Y at location n, page 1.

The background files may include reference line work, a picture, progress lines or avoidance zones. The reference line work may be a property boundary or an intersecting existing roadway. The picture may be an aerial photograph of the project site. The progress lines may be lines defining a previous level of work. The avoidance zone may be an ecologically sensitive or hazardous area.

The application program provide applets A through Y to the individual construction machines 16 for using the project data files 12. The applets may be used in order to interpret, run or display the information for the communication system, the work order, the geographical calibration and/or the project control files. For example, the applet 11A is the applet that enables the machine 16 corresponding to the project plan machine identification A (grader) to use the task 11A, comm 11A, calibration 11 and/or design control files 11. The applet 12F is the applet that enables the machine 16 corresponding to the project plan machine identification F (grader) to use the task 12F, comm 12F, calibration 12 and/or design control files 12. The applet 1nK is the applet that enables the machine 16 corresponding to the project plan machine identification K (grader) when the machine K (grader) to use the task 1nK, comm 1nK, calibration 1n and/or design control files 1n. The applet 21P is the applet that enables the machine 16 corresponding to the project plan machine identification P (grader) to use the task 21P, comm 21P, calibration 21 and/or design control files 21. The applet n1U is the applet that enables the machine 16 corresponding to the project plan machine identification U (grader) to use the task n1U, comm n1U, calibration n1 and/or design control files n1. The applets are similarly specified for machines 16 corresponding to the project plan machine identifications A-Y when they are at their respective locations 1 through n and location pages 1 through n.

FIG. 4 illustrates a preferred embodiment of the database 22 where the project data files 24 are represented as being stored in association with elevations. For example, task 11B-e1, design DTM 11B-e1, current DTM 11B-e1 and background files 11-*e1* are stored in association with location 1, page 1, project plan machine identification B (bulldozer) and elevation 1. Task 11B-e2, design DTM 11B-e2, current DTM 11B-e2 and background files 11-*e2* are stored in association with location 1, page 1, project plan machine identification B (bulldozer) and elevation 2. Task 11B-e3, design DTM 11B-e3, current DTM 11B-e3 and background files 11-*e3* are stored in association with location 1, page 1, project plan machine identification B (bulldozer) and elevation 3. Task 11B-e4, design DTM 11B-e4, current DTM 11B-e4 and background files 11-*e4* are stored in association with location 1, page 1, project plan machine identification B (bulldozer) and elevation 4. There may be more any number of elevations. Similar associations may be made for other locations 1 through n, pages 1 through n, project plan machine identifications A through Y.

FIG. 5 illustrates a preferred embodiment of the database 22 where the project data files 24 are represented as being stored in association with times. For example, task 11B-t1, design DTM 11B-t1, current DTM 11B-t1 and background files 11-*t1* are stored in association with location 1, page 1, project plan machine identification B (bulldozer) and time 1. Task 11B-t2, design DTM 11B-t2, current DTM 11B-t2 and background files 11-*t2* are stored in association with location 1, page 1, project plan machine identification B (bulldozer) and time 2. Task 11B-t3, design DTM 11B-t3, current DTM 11B-t3 and background files 11-*t3* are stored in association with location 1, page 1, project plan machine identification B (bulldozer) and time 3. Task 11B-t4, design DTM 11B-t4, current DTM 11B-t4 and background files 11-*t4* are stored in association with location 1, page 1, project plan machine identification B (bulldozer) and time 4. There may be more any number of times. Similar associations may be made for other locations 1 through n, pages 1 through n, project plan machine identifications A through Y.

FIG. 6 is a flow chart of a method of the present invention for distributing the selected project data files 12. In a step 100 the project data files 24 are organized for project site locations optionally including pages, elevations and times; and project plan machine identifications. In step 120 the project data distributor receives the machine signal from the construction machine. In a step 140 the project data distributor uses the information in the machine signal for selecting the project data files 12 for the location and/or identification of the machine. Then, in a step 160 the project data distributor 14 transmits the data distribution signal to the machine. At a subsequent time, in a step 180 the project data distributor may receive another machine signal having information for updating the selected project data files 12.

FIG. 7A is a flow chart of the step 100 for organizing the project data files. In a step 102 the files are organized for project site locations. In a step 104 the files are organized for location pages. In a step 106 the files are organized for project plan machine identification. In a step 108 the files are organized for elevations. In a step 110 the files are organized for times. It should be noted that not all the steps 102-110 need be performed and that the steps that are performed may be performed one at a time in any order or may be performed all together at once. The project data files 24 on the database 22 organized as described may be contained on the tangible medium 80 in a form that may be read by a processor.

FIG. 7B is a flow chart of the step 120 for receiving the machine signal. In a step 122 the machine signal information is received for the location of the construction machine. In a step 124 the machine signal information is received for the identification of the construction machine. In a step 126 the machine signal information is received for the elevation of the construction machine. In a step 128 the machine signal information is received for time from the construction machine. It should be noted that not all the steps 122-128 need be performed and that the steps that are performed may be performed one at a time in any order or may be performed all together at once.

FIG. 7C is a flow chart of the step 140 for selecting the project data files. In a step 142 the files are selected for project site locations. In a step 144 the files are paged to location pages. In a step 146 the files are selected for project plan machine identification. In a step 148 the files are selected for elevation. In a step 150 the files are selected for time. It should be noted that not all the steps 142-150 need be performed and that the steps that are performed may be performed one at a time in any order or may be performed all together at once.

Figure 8:
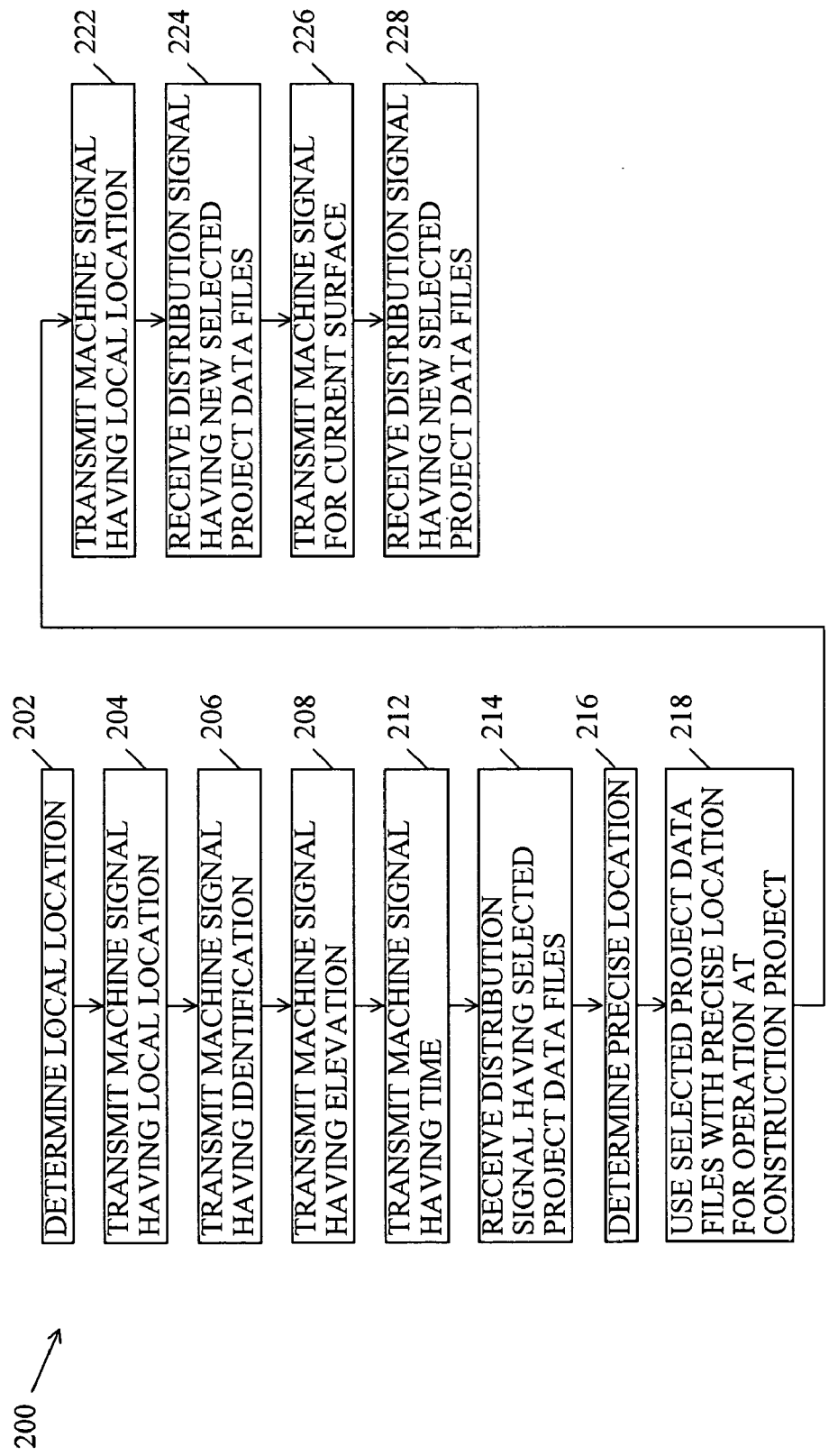
FIG. 8 is a flow chart of a method of the present invention for receiving project data files.

FIG. 8 is a flow chart of a method of the present invention for receiving selected project data files 12. The present invention may be embodied on a tangible medium 200 containing a set of instructions for causing a processor to control a machine to carry out the steps of the method. The medium may be a digital memory device such as a digital video device (DVD), compact disk (CD), electronic memory chips, a hard disk, or the like. In a step 202 the construction machine determines its location 45. In a step 204 the machine transmits a machine signal having the location. In a step 206 the machine transmits its identification. In a step 208 the machine transmits its elevation. In a step 212 the machine transmits its time. The machine signal may include elevation and/or time. It should be noted that not all the steps 204-212 need be performed and that the steps that are performed may be performed one at a time in any order or may be performed all together at once.

The construction machine receives a distribution signal in a step 214 having the project data files 12 selected for the matching project site location and project plan machine identification in response to the machine signal. In a step 216 the machine determines its precise location or position 46. The machine may be determining its precise location 46 at any time, before or after receiving the distribution signal. Then, in a step 218 the machine or the operator of the machine uses the precise location 46 and the selected project data files 12 for operation.

After operation has begun, in a further step 222 the machine 16 transmits the machine signal for a new local location 45. In a step 224 the machine 16 receives the distribution signal having the selected project data files 12 for a new location page. In a step 226 the machine 16 transmits the machine signal for a current surface in order to update the current digital terrain model at the project data distributor 14. In a step 228 the machine 16 receives the distribution signal having new selected project data files 12 and so on for the operation of the machine 16 on the construction project.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A location-centric construction project data delivery apparatus, comprising:
    a database including construction project data files organized in association with data for project site locations, a particular one of said project site locations defined by said data for a geographical boundary of a particular one of multiple construction projects;
    a receiver for receiving a machine signal having information for a geographical location from a remote construction machine;
    a search program for selecting said project data files where said site location encompasses said machine location;
    a data distribution transmitter for transmitting a distribution signal having said location-selected project data files to said construction machine for directing current work of said machine, and wherein:
    said project data files are further organized in association with project plan machine identifications, said project data files for directing current work of said remote machine for said construction project;
    said machine signal further includes information for a remote identification for uniquely identifying said machine; and
    the search program searches said database for selecting said location-selected project data files where said project plan machine identification matches said remote machine identification.

2. The apparatus of claim 1, wherein:
    said machine signal is transmitted automatically at power-up of said construction machine.

3. The apparatus of claim 1, wherein:
    said location-selected project data files include a design digital terrain model for a surface that is required according to a construction plan corresponding to said construction project.

4. The apparatus of claim 1, wherein:
    said location-selected project data files include a work order for describing a task to be done with said remote machine.

5. The apparatus of claim 1, wherein:
    said location-selected project data files include an applet having programming for using at least one of said location-selected project data files in said remote machine.

6. The apparatus of claim 1, wherein:
    said location-selected project data files include background files having at least one of an avoidance zone, a property boundary, an intersecting existing roadway and aerial photograph.

7. The apparatus of claim 1, wherein:
    said machine signal includes information for a current digital terrain model; and further comprising:

a model update program for updating said location-selected project data files with said current digital terrain model.

8. A location-centric construction project data delivery apparatus, comprising:
a database including construction project data files organized in association with data for project site locations, a particular one of said project site locations defined by said data for a geographical boundary of a particular one of multiple construction projects;
a receiver for receiving a machine signal having information for a geographical location from a remote construction machine;
a search program for selecting said project data files where said site location encompasses said machine location;
a data distribution transmitter for transmitting a distribution signal having said location-selected project data files to said construction machine for directing current work of said machine, and wherein:
said location-selected project data files include a geographical calibration for converting between coordinates of a local precise position determined by said remote machine and a coordinate system for precise work according to a digital terrain model, said local precise position different than said location determined from said information in said machine signal.

9. The apparatus of claim 8, wherein:
said location-selected project data files include a design digital terrain model for a surface that is required according to a construction plan corresponding to said construction project.

10. A location-centric construction project data delivery apparatus, comprising:
a database including construction project data files organized in association with data for project site locations, a particular one of said project site locations defined by said data for a geographical boundary of a particular one of multiple construction projects;
a receiver for receiving a machine signal having information for a geographical location from a remote construction machine;
a search program for selecting said project data files where said site location encompasses said machine location;
a data distribution transmitter for transmitting a distribution signal having said location-selected project data files to said construction machine for directing current work of said machine, and wherein:
said project data files are further organized in association with location pages within said project site locations; and
the search program includes a geographical pager for paging said location-selected project data files when said machine location moves across a page boundary for selecting said location-selected project data files where said location page encompasses said machine location.

11. A location-centric construction project data delivery apparatus, comprising:
a database including construction project data files organized in association with data for project site locations, a particular one of said project site locations defined by said data for a geographical boundary of a particular one of multiple construction projects;
a receiver for receiving a machine signal having information for a geographical location from a remote construction machine;
a search program for selecting said project data files where said site location encompasses said machine location;
a data distribution transmitter for transmitting a distribution signal having said location-selected project data files to said construction machine for directing current work of said machine, and wherein:
said machine signal further includes information from said machine for a remote elevation;
said project data files are further organized in association with project elevation ranges; and
the search program includes an elevation selector for selecting said location-selected project data files where said project elevation range encompasses said remote elevation.

12. A location-centric construction project data delivery apparatus, comprising:
a database including construction project data files organized in association with data for project site locations, a particular one of said project site locations defined by said data for a geographical boundary of a particular one of multiple construction projects;
a receiver for receiving a machine signal having information for a geographical location from a remote construction machine;
a search program for selecting said project data files where said site location encompasses said machine location;
a data distribution transmitter for transmitting a distribution signal having said location-selected project data files to said construction machine for directing current work of said machine, and wherein:
said machine signal further includes information from said machine for a remote time;
said project data files are further associated with project time ranges; and
said search program includes a time selector for selecting said location-selected project data files where said project time range encompasses said remote time.

13. A location-centric method for distributing project data files for construction, comprising:
organizing construction project data files in association with data for project site locations in a database, a particular one of said project site locations defined by said data for a geographical boundary of a particular one of multiple construction projects;
receiving a machine signal having information for a geographical location from a remote construction machine;
selecting said project data files where said project site location encompasses said machine location;
transmitting a distribution signal having said location-selected project data files to said construction machine for directing current work of said machine;
organizing said project data files in association with project plan machine identifications; and wherein:
said machine signal further includes information for a remote identification for uniquely identifying said machine; and
selecting said project data files further includes selecting said project data files where said project plan machine identification matches said remote machine identification.

14. The method of claim 13, wherein:
said machine signal is transmitted automatically at power-up of said construction machine.

15. The method of claim 13, wherein:
said location-selected project data files include a design digital terrain model for a surface that is required according to a construction plan corresponding to said construction project.

16. The method of claim 13, wherein:
said location-selected project data files include a work order for describing a task to be done with said remote machine.

17. The method of claim 13, wherein:
said location-selected project data files include an applet having programming for using at least one of said location-selected project data files in said remote machine.

18. The method of claim 13, wherein:
said location-selected project data files include background files having at least one of an avoidance zone, a property boundary, an intersecting existing roadway and aerial photograph.

19. The method of claim 13, wherein:
said machine signal includes information for a current digital terrain model; and further comprising:
a model update program for updating said location-selected project data files with said current digital terrain model.

20. A location-centric method for distributing project data files for construction, comprising:
organizing construction project data files in association with data for project site locations in a database, a particular one of said project site locations defined by said data for a geographical boundary of a particular one of multiple construction projects;
receiving a machine signal having information for a geographical location from a remote construction machine;
selecting said project data files where said project site location encompasses said machine location;
transmitting a distribution signal having said location-selected project data files to said construction machine for directing current work of said machine; and wherein:
said location-selected project data files include a geographical calibration for converting between coordinates of a local precise position determined by said remote machine and a coordinate system for precise work according to a digital terrain model, said precise position different that said location determined from said information in said machine signal.

21. The method of claim 20, wherein:
said location-selected project data files include a design digital terrain model for a surface that is required according to a construction plan corresponding to said construction project.

22. A location-centric method for distributing project data files for construction, comprising:
organizing construction project data files in association with data for project site locations in a database, a particular one of said project site locations defined by said data for a geographical boundary of a particular one of multiple construction projects;
receiving a machine signal having information for a geographical location from a remote construction machine;
selecting said project data files where said project site location encompasses said machine location;
transmitting a distribution signal having said location-selected project data files to said construction machine for directing current work of said machine;
organizing said project data files in association with location pages within said project site locations; and
paging said location-selected project data files when said machine location moves across a page boundary for selecting said location-selected project data files where said location page encompasses said machine location.

23. A location-centric method for distributing project data files for construction, comprising:
organizing construction project data files in association with data for project site locations in a database, a particular one of said project site locations defined by said data for a geographical boundary of a particular one of multiple construction projects;
receiving a machine signal having information for a geographical location from a remote construction machine;
selecting said project data files where said project site location encompasses said machine location;
transmitting a distribution signal having said location-selected project data files to said construction machine for directing current work of said machine;
organizing said project data files in association with project elevation ranges;
selecting said location-selected project data files where said project elevation range encompasses a remote elevation; and wherein:
said machine signal further includes information from said machine for said remote elevation.

24. A location-centric method for distributing project data files for construction, comprising:
organizing construction project data files in association with data for project site locations in a database, a particular one of said project site locations defined by said data for a geographical boundary of a particular one of multiple construction projects;
receiving a machine signal having information for a geographical location from a remote construction machine;
selecting said project data files where said project site location encompasses said machine location;
transmitting a distribution signal having said location-selected project data files to said construction machine for directing current work of said machine;
organizing said project data files in association with project time ranges;
selecting said location-selected project data files where said project time range encompasses a remote time; and wherein:
said machine signal further includes information from said machine for said remote time.

25. A tangible medium having a database in a form that may be read by a processor, wherein the tangible medium is a digital memory device, comprising:
data for project site locations, a particular one of said project site locations defined by said data for a geographical boundary of a particular one of multiple construction projects;
project plan machine identifications for construction machines;
construction project data files organized in association with the project site locations and the project plan machine identifications; and wherein:
said project data files include a geographical calibration for converting between coordinates of a local precise position determined by a remote machine and said machine's position in a local coordinate system for precise work according to a digital terrain model.

26. The tangible medium of claim 25, further comprising:
location pages with the project site locations; and wherein:
the construction project data files are further organized in association with the location pages.

27. The tangible medium of claim 25, wherein:

the construction project data files include applets having programming for the construction machines for using the construction project data files at the project site locations.

28. The tangible medium of claim 25, wherein:

the construction project data files include a design digital terrain model representing a surface that is required according to a construction plan at the project site location.

29. The tangible medium of claim 25, wherein:

the construction project data files include a current digital terrain model representing a surface as it exists at the project site location.

30. The tangible medium of claim 25, wherein:

the construction project data files include a communication system specification for at least one of equipment, channel, coding and routing information for transmitting the construction project data files to the construction machines.

31. The tangible medium of claim 25, wherein:

the construction project data files include work orders for specifying tasks that are to be performed by the construction machines.

32. The tangible medium of claim 25, wherein:

the construction project data files include background files having at least one of an avoidance zone, a property boundary, an intersecting existing roadway and aerial photograph.

* * * * *